United States Patent
Glover

(10) Patent No.: US 7,589,646 B2
(45) Date of Patent: Sep. 15, 2009

(54) SYSTEMS AND METHODS FOR DETERMINING BEST PATH FOR AVOIDANCE OF TERRAIN, OBSTACLES, OR PROTECTED AIRSPACE

(75) Inventor: John H. Glover, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 238 days.

(21) Appl. No.: 11/367,671

(22) Filed: Mar. 3, 2006

(65) Prior Publication Data

US 2006/0158350 A1    Jul. 20, 2006

Related U.S. Application Data

(63) Continuation-in-part of application No. 10/782,055, filed on Feb. 19, 2004, now Pat. No. 7,098,810.

(60) Provisional application No. 60/661,304, filed on Mar. 9, 2005.

(51) Int. Cl.
*G08B 23/00* (2006.01)
(52) U.S. Cl. .................. 340/963; 701/14; 340/979; 340/976
(58) Field of Classification Search . 340/995.1–995.28, 340/963, 988, 989, 992, 976, 979; 701/14
See application file for complete search history.

(56) References Cited

U.S. PATENT DOCUMENTS

| 4,760,396 | A  | * | 7/1988  | Barney et al. ............... 342/65 |
| 4,812,990 | A  |   | 3/1989  | Adams et al. |
| 5,442,556 | A  | * | 8/1995  | Boyes et al. ................. 701/9 |
| 5,613,640 | A  | * | 3/1997  | Furuya et al. ............ 239/585.5 |
| 5,631,640 | A  | * | 5/1997  | Deis et al. .................... 340/961 |
| 5,706,011 | A  | * | 1/1998  | Huss et al. .................... 342/65 |
| 6,281,832 | B1 | * | 8/2001  | McElreath .................... 342/65 |
| 6,317,690 | B1 |   | 11/2001 | Gia |
| 6,405,124 | B1 | * | 6/2002  | Hutton ....................... 701/200 |
| 7,382,287 | B1 | * | 6/2008  | Chen et al. .................. 340/972 |
| 2005/0248470 | A1 | * | 11/2005 | Berthe ....................... 340/961 |

FOREIGN PATENT DOCUMENTS

EP        1369665 A2    12/2003

* cited by examiner

*Primary Examiner*—Davetta W Goins
*Assistant Examiner*—Edny Labbees
(74) *Attorney, Agent, or Firm*—Black Lowe & Graham PLLC

(57) ABSTRACT

Systems and methods for generating navigation signals for a vehicle in an auto-avoidance situation. In one embodiment the method includes analyzing two or more paths with respect to information about obstructions stored in a database. The method disclosed then selects a path and generates navigation signals, if an auto avoidance situation exists.

16 Claims, 3 Drawing Sheets

SYSTEMS AND METHODS FOR DETERMINING BEST PATH FOR AVOIDANCE OF TERRAIN, OBSTACLES, OR PROTECTED AIRSPACE

CROSS-REFERENCE TO RELATED APPLICATIONS

This application is a Continuation-in-Part of U.S. patent application Ser. No. 10/782,055 filed Feb. 19, 2004, now U.S. Pat. No. 7,098,810 the contents of which are hereby incorporated by reference. This application claims the benefit of U.S. Provisional Application Ser. No. 60/661,304 filed Mar. 9, 2005, the contents of which are hereby incorporated by reference.

BACKGROUND OF THE INVENTION

An obvious intent of any automatic recovery system for almost any aircraft is to prevent ground impact during controlled flight of the aircraft. Many aircraft have standard proximity alarms for alerting pilots to the nearness of ground. These alarms can be based on inadmissible rates of descent of the aircraft or nearness of the ground. While proximity alarms are an improvement over prior systems, they are not a permanent solution to some of the problems that have been shown to cause aircraft ground impacts.

The need for ground collision avoidance extends to a wide variety of aircraft and scenarios ranging from terminal area navigation for commercial airliners to low level navigation, pilot spatial disorientation and g-induced loss of consciousness (G-LOC) for high performance aircraft. While some aircraft have been equipped with ground proximity warning systems, most of the existing ground proximity warning systems contain no provisions for variations in aerodynamics, but rather rely on the pilot to compensate for these variations by giving him a finite amount of time to recover level flight. At the same time, these systems are passive, relying on pilot awareness and competence to recover from the situation.

An innovative approach to this problem is disclosed in U.S. Pat. No. 4,058,710 to Altman. Altman discloses a process for preventing unwanted contact by an aircraft with land or water. When applied over land Altman assumes flat terrain or low hills. Altman's process utilizes the aircraft's rate of descent and altitude to compute a limiting altitude, which is further modified by the aircraft's ability for transverse acceleration. This limiting altitude is used to determine when to activate an automatic feedback controller, which provides the aircraft with the maximum feasible transverse acceleration. Thus, Altman attempts to continuously calculate a limiting altitude for the aircraft below which automatic controls will be applied for aircraft recovery. Various theoretical schemes are proposed by Altman for determining this limiting altitude. All of these schemes are difficult to incorporate into an aircraft control design or to simplify in a manner that will not cause spurious effects including nuisance flyups during controlled flight.

The current Enhanced Ground Proximity Warning System (EGPWS) is designed to provide pilots with timely alerts in the event that the airplane is flown towards terrain or an obstacle. The EGPWS alerting algorithms are predicated on the expectation that the response of the pilot to a warning will be a "pull-up", i.e. a maneuver in the vertical plane only. If an aircraft is about to enter restricted airspace, it may not be possible to avoid the airspace by using a "pull-up" maneuver alone. Also, some airspace volumes expand laterally with altitude, and again a "pull-up" may not avoid penetrating the airspace volume.

A need therefore exists for a ground, obstacle, and protected airspace auto-recovery system that is sufficiently sophisticated to initiate a recovery maneuver when required while avoiding a multitude of nuisance recoveries that interfere with controlled flight and providing smooth recovery maneuvers for crew and passenger safety and comfort.

BRIEF SUMMARY OF THE INVENTION

Systems and methods for generating navigation signals for a vehicle in an auto-avoidance situation are disclosed. In one embodiment the method includes analyzing two or more paths with respect to information about obstructions stored in a database. The information stored is made up of terrain, obstacles and protected airspace data. The method disclosed then selects a path and generates navigation signals if an auto-avoidance condition exists.

In accordance with further aspects of the invention, analysis is further based on a combination of the following: performance capabilities of the vehicle and speed of the vehicle.

In accordance with other aspects of the invention, after navigation signals are transmitted, the path information is stored in the database and vehicle control signals are sent to a vehicle control system.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

Figure 1:
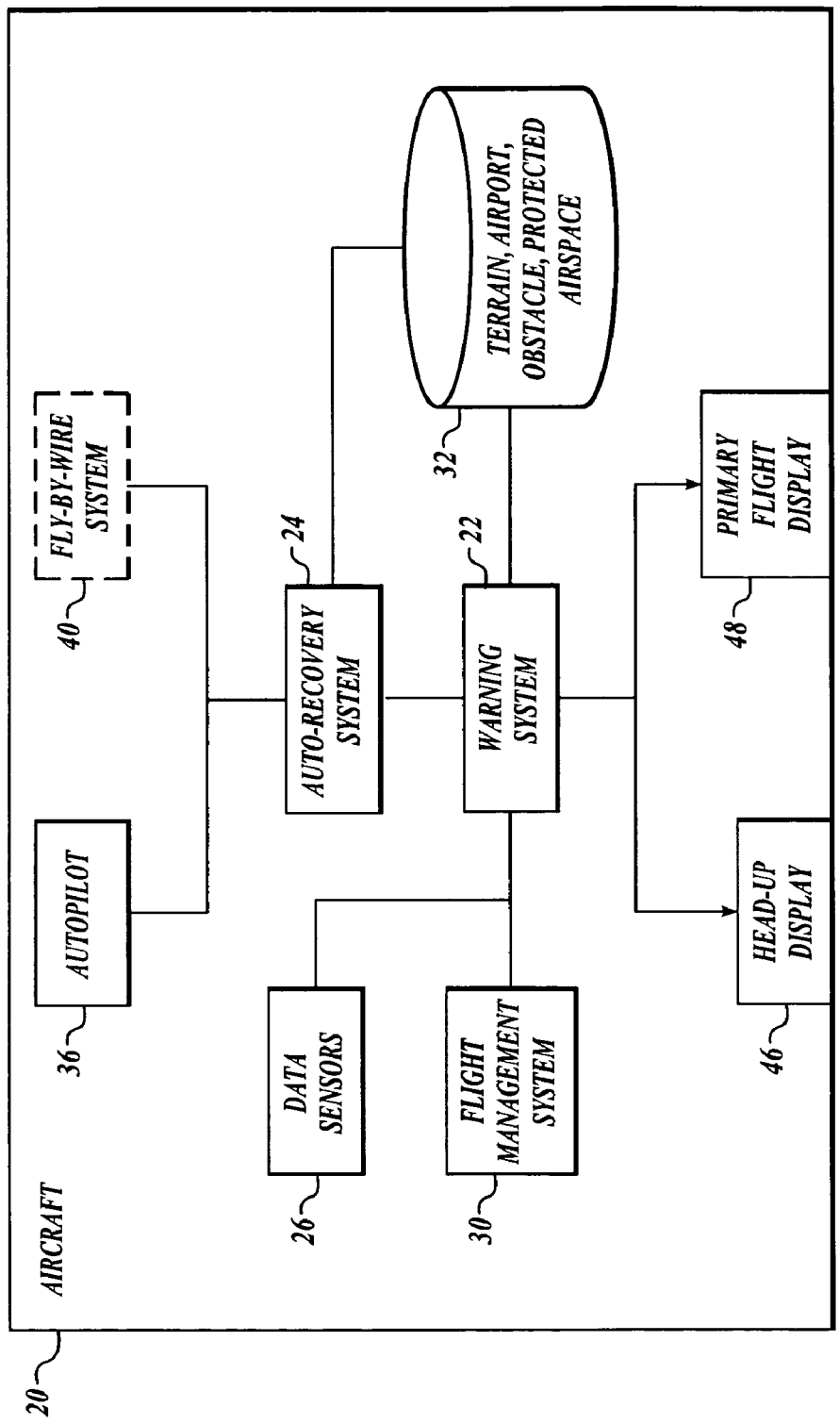
FIG. 1 is a block diagram of components of the present invention.

As shown in FIG. 1, an aircraft 20 includes a warning system 22 coupled to an auto-recovery system 24. The warning system 22, such as the Enhanced Ground Proximity Warning System (EGPWS) produced by Honeywell, Inc., is coupled to various aircraft data sensors 26, and a Flight Management System (FMS) 30 or similar flight information systems. An example of the warning system 22 is a ground proximity warning system as shown and described in U.S. Pat. No. 5,839,080 titled Terrain Awareness System, which is hereby incorporated by reference. The warning system 22 is also coupled to a database 32 that may include one or more of a terrain database, an airport database, an obstacle database, and a protected airspace database. The auto-recovery system 24 is also coupled to an autopilot 36 or in an alternate embodiment to a fly-by-wire system 40.

In one embodiment of the invention, the auto-recovery system 24 sends flight control commands, such as pitch or roll commands, to the autopilot 36 after some predefined period of time has elapsed since a caution or warning has been identified by the warning system 22. In another embodiment, an integrity flag is received at the auto-recovery system 24 from the warning system 22. The integrity flag indicates either high integrity or low integrity. If low integrity is indicated, the auto-recovery system 24 will not perform any auto-recovery maneuvers. However, if the integrity flag is set high, the auto-recovery system 24 will execute auto-recovery if an auto-recovery condition exists (warning or caution).

In another embodiment, after a caution or warning has been identified and outputted by the warning system 22, the auto-recovery system 24 analyzes a plurality of escape routes, selects the best escape route, and sends corresponding pitch and roll commands to the autopilot 36. This is described in more detail below with respect to the flow diagrams of FIGS. 2 and 3.

The auto-recovery system 24 may be a separate general-purpose computer system that includes internal memory and a processing device that executes an auto-recovery application program stored within the memory or may be implemented as software within the warning system 22.

Figure 2:
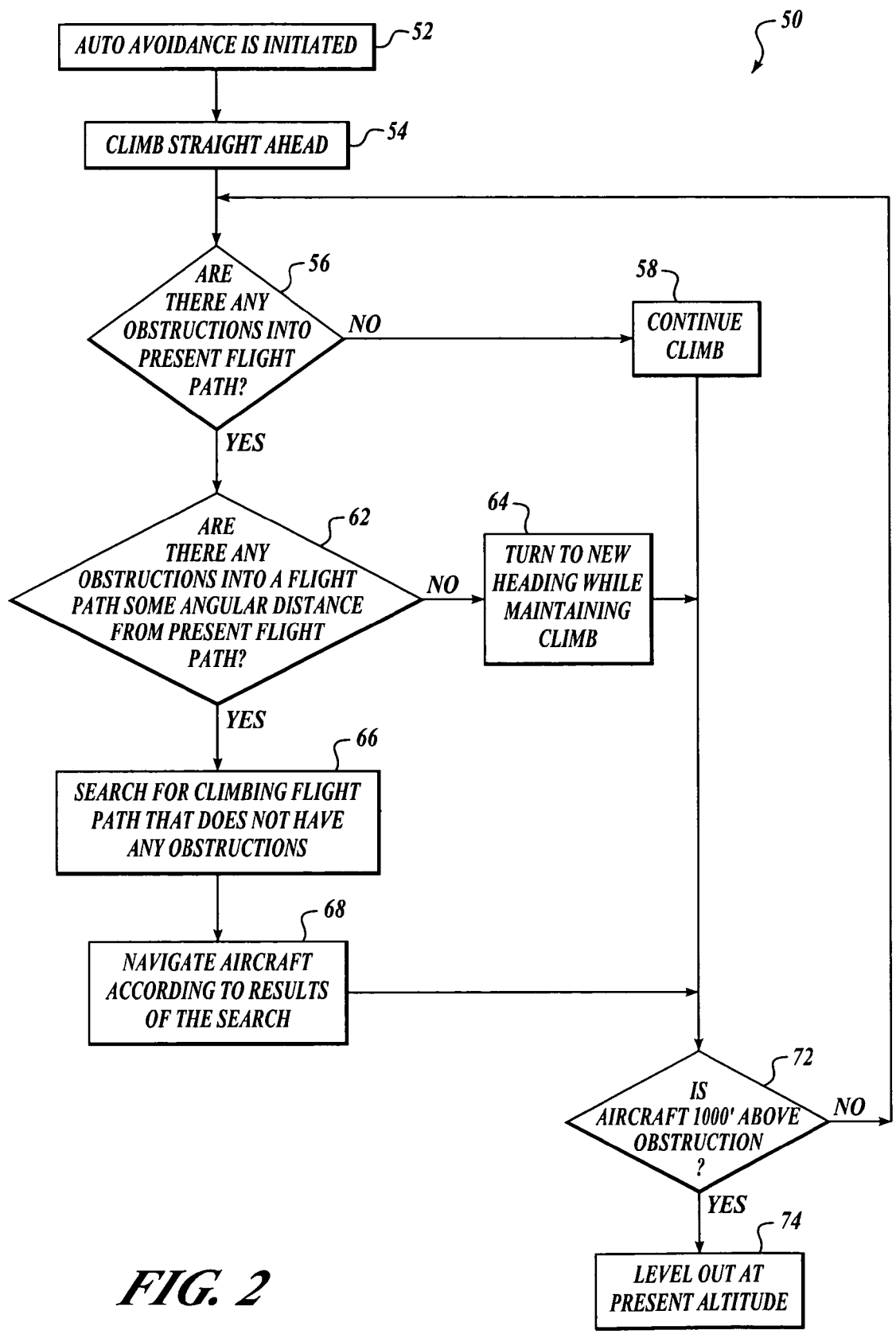
FIG. 2 is a flow diagram of an example process performed by the systems shown in FIG. 1; and, FIG. 3 is a flow diagram of an example process performed by the systems shown in FIG. 1.

FIG. 2 illustrates an embodiment of an example process 50 performed by the systems shown in FIG. 1. First at a block 52, auto-avoidance is initiated. Auto-avoidance is initiated when an alert condition has been identified and no pilot input has been received within a certain period since the identification of the alert condition. One example of auto-avoidance initiation is after a warning alert produced by the warning system 22 has occurred for a threshold number of seconds and no pilot action has been taken.

Next, at a block 54, the auto-recovery system 24 instructs the autopilot 36 or other flight control system to perform a straight ahead climb. At a decision block 56, the system 24 determines if there are any obstructions into the present flight path (i.e., the straight ahead climb). If no obstructions are found to be present within the present flight path, then at a block 58, the process continues the climb. If, however, at the decision block 56, an obstruction was observed to protrude into the present flight path, then the process 50 continues to a decision block 62 which determines if there are any obstructions into one or more flight paths that are at varying angular horizontal directions from the present flight path. If it is observed that an obstruction does not protrude into one of the other flight paths, then at a block 64, the autopilot 36 is commanded to turn to the heading associated with this unobstructed flight path while maintaining the climbing profile. If at the decision block 62, an obstruction is observed to protrude into the observed flight path, then at a block 66, a search continues for a climbing path that does not have any obstructions. Once a climbing flight path has been observed, then at block 68, the aircraft is instructed to navigate according to the results of the search. After the actions performed at the blocks 58, 64, and 68, the process 50 determines if the aircraft is some safe distance above the nearest highest obstruction or above the obstruction that is along the present flight path. If it is determined at the decision block 72 that the aircraft is not yet above the observed obstruction then, the most recent command is maintained until the aircraft is safely above the observed obstruction and the process 50 returns to the decision block 56 for further analysis and any necessary maneuvering. If at the decision block 72 the aircraft is safely above the observed obstruction, then at the block 74, the aircraft is instructed to level out at the present or a predefined altitude.

Figure 3:
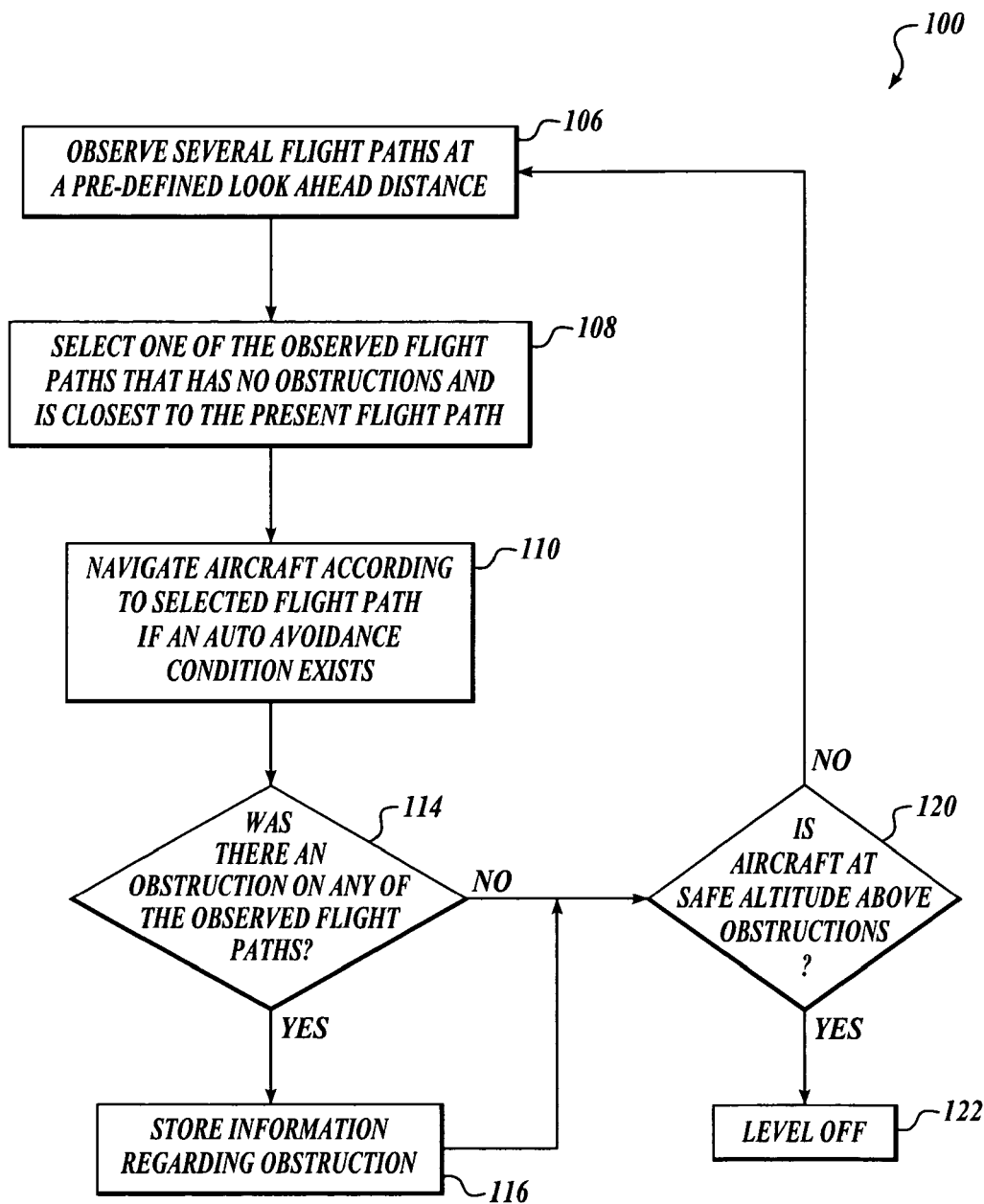

FIG. 3 illustrates another example process 100 that may be performed by the system shown in FIG. 1. First at a block 106, the auto-recovery system 24 observes several flight paths at a first pre-defined look ahead distance. At a block 108, a flight path of the observed several flight paths that has no obstructions and is closest to the present flight path is selected. At a block 110, the autopilot 36 is instructed to navigate according to the selected flight path, if an auto avoidance condition exists. Next at a decision block 114, the system 24 determines if there were any obstructions that were observed on any of the observed several flight paths. If there were obstructions observed on any one of the observed flight paths, then at a block 116, the information regarding that flight path and the observed obstruction are stored for further use. The stored information can be used later To reduce the search time if another search is required—known 'obstructed' paths are immediately eliminated.

If at the decision block 114, there were no obstructions observed along the flight path and after the information regarding flight paths having obstructions has been stored, the process 100 determines if the aircraft is at a safe altitude above any observed obstructions. If the aircraft is determined to be safely above any observed obstructions, then at block 122, the aircraft is instructed to level off. If, however, the aircraft is still not briefly above the obstructions, the process returns to the block 106 to perform further observations along multiple flight paths.

In the embodiment of FIG. 3, a climb out is normally performed, although it is possible of a military application where climbing would not be desirable (e.g. to stay below radar), and would not necessarily be performed.

In another embodiment, the system 24 is always searching the database 32 (even when an alert condition does not exist) for terrain, obstacles and protected airspace and determines if the search discovers an obstruction within the predefined horizontal distance (e.g., 5 mm) that are above the aircraft and that penetrate a conical or other shaped surface having a predetermined upward slope (e.g., 6 degrees). The upward slope represents an expected climb gradient capability of the aircraft. A first (horizontal only) flight path is calculated to avoid all obstructions discovered in the search. A second flight path is calculated based on various climb gradients (e.g., 3 degree, 10 degree). The first and second flight paths are weighted based on any or all of a number of factors, such as closeness to the present flight path, minimal changes to pitch or roll. The system 24 selects the best flight path based on the weighting. The system 24 sends control signals relating to the selected flight path to the autopilot 36 after either the system 24 or the warning system 22 has determined that an auto-recovery condition exists. In one embodiment, for the second flight path, there may be more than one climbing flight paths analyzed. Ideally, the system should choose a horizontal path that requires the least climb gradient (in case an engine fails during the maneuver).

Many alternations of the previous methods may be performed. For example, one example algorithm determines if any of a number of paths from the aircraft's present location provides a thousand feet of clearance above all terrain, obstacles, or protected airspaces within one nautical mile of the aircraft's present position. If a level flight path (no climb) provides this clearance, then it is chosen. Otherwise, if a 3° climb path provides clearance, then it is chosen. Otherwise, a 6° path is chosen. If several lateral paths provide the desired clearance, then the path with the least deviation from the current track of the aircraft is chosen.

In yet another embodiment the aircraft disclosed may also be a surface based vehicle or a sub surface based vehicle.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for automatically navigating a vehicle in an auto-avoidance situation, the method comprising:
   a) analyzing two or more paths with respect to information stored in a database regarding obstructions, each path comprising a single directional heading;
   b) selecting one of the analyzed paths based on the analysis;
   c) generating navigation signals based on the selected paths; and
   d) automatically navigating the vehicle based on the generated navigation signals, if an auto-avoidance condition exists;
   e) performing a-d only when an alert condition has been identified and no pilot input has been received within a predefined period since the identification of the alert condition,
   wherein the alert condition is identified based on obstruction information other than previously unknown obstruction information.

2. The method of claim 1, wherein analyzing is further based on at least one of performance capabilities of the vehicle, speed of the vehicle, and performing an integrity analysis.

3. The method of claim 1, wherein analyzing further includes storing the vehicle path information in a database.

4. The method of claim 1, wherein the vehicle is at least one of a surface based vehicle, a subsurface based vehicle, and an airborne vehicle.

5. A computer program product stored on a computer readable medium for generating navigation signals for a vehicle in an auto-avoidance situation, the computer program product comprising:
   a first component for analyzing two or more paths with respect to information stored in a database regarding obstructions, each path comprising a single directional heading;
   a second component for selecting one of the analyzed paths based on the analysis;
   a third component for generating navigation signals based on the selected paths; and
   if an auto-avoidance condition exists, a fourth component to send vehicle control commands to a vehicle control system wherein the vehicle control system automatically controls the vehicle based on vehicle control commands,
   wherein the auto-avoidance condition is determined by a collision warning system and an auto-recovery system.

6. The computer program product of claim 5, wherein the first component for analyzing is further based on at least one of performance capabilities of the vehicle, speed of the vehicle, and performing an integrity analysis.

7. The computer program product of claim 5, wherein the first component for analyzing further includes storing the vehicle path information in a database.

8. The computer program product of claim 5, wherein the vehicle is at least one of a surface based vehicle, a subsurface based vehicle, and an airborne vehicle.

9. A system for generating navigation signals for a vehicle in an auto-avoidance situation, the system comprising:
   means for receiving obstruction information;
   means for authenticating an obstruction included in the received obstruction information using an integrity check; and
   means for analyzing possible vehicle routes, each route comprising a single directional heading;
   wherein the system is coupled to a vehicle control system and has the ability to automatically control the vehicle, if an auto-avoidance situation exists,
   wherein the auto-avoidance condition is determined by a collision warning system and an auto-recovery system.

10. The system of claim 9, wherein the obstruction information comprises information regarding terrain, obstacles and protected airspace.

11. The system of claim 9, wherein the system is coupled to a database in order to store flight path information and obstruction information.

12. The system of claim 11, wherein the system is further coupled to at least one of a terrain database, airport database, obstacle database, and a protected airspace database.

13. The system of claim 9, wherein the route is selected based on vehicle capabilities, proximity of chosen path, and vehicle speed.

14. The system of claim 9, wherein the vehicle is at least on of a surface based vehicle, a subsurface based vehicle, and an airborne vehicle.

15. The computer program product of claim 5, wherein the first, second, third and fourth components operate only when an alert condition has been identified and no pilot input has been received within a predefined period since the identification of the alert condition,
   wherein the alert condition is identified based on obstruction information other than previously unknown obstruction information.

16. The system of claim 9, wherein the means operate only when an alert condition has been identified and no pilot input has been received within a predefined period since the identification of the alert condition,
   wherein the alert condition is identified based on obstruction information other than previously unknown obstruction information.

* * * * *